US009651650B2

(12) United States Patent
Muñiz Garcia et al.

(10) Patent No.: US 9,651,650 B2
(45) Date of Patent: May 16, 2017

(54) POSITIONING IN WIRELESS COMMUNICATION SYSTEMS

(75) Inventors: Claudia Muñiz Garcia, Stockholm (SE); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 520 days.

(21) Appl. No.: 14/113,401

(22) PCT Filed: Apr. 27, 2011

(86) PCT No.: PCT/SE2011/050507
§ 371 (c)(1),
(2), (4) Date: Oct. 23, 2013

(87) PCT Pub. No.: WO2012/148327
PCT Pub. Date: Nov. 1, 2012

(65) Prior Publication Data
US 2014/0050112 A1    Feb. 20, 2014

(51) Int. Cl.
*H04J 3/14*    (2006.01)
*G01S 5/00*    (2006.01)
(Continued)

(52) U.S. Cl.
CPC .......... *G01S 5/0036* (2013.01); *G01S 5/0009* (2013.01); *G01S 5/0054* (2013.01); *G01S 5/0205* (2013.01); *G01S 5/12* (2013.01); *G01S 5/14* (2013.01)

(58) Field of Classification Search
CPC .............................. G01S 5/0036; G01S 5/0054
(Continued)

(56) References Cited

U.S. PATENT DOCUMENTS

2002/0094820 A1*   7/2002   Keranen et al. ............... 455/456
2007/0279281 A1*   12/2007   Oda et al. ................. 342/357.06
(Continued)

FOREIGN PATENT DOCUMENTS

EP    1862814 A1    12/2007
GB    2463600 A     3/2010
(Continued)

OTHER PUBLICATIONS

Kangas, A. et al. "Location Coverage and Sensitivity with A-GPS." URSI EMTS 2004. Stockholm, Sweden.
(Continued)

*Primary Examiner* — Ricky Ngo
*Assistant Examiner* — Wei-Po Kao
(74) *Attorney, Agent, or Firm* — Murphy, Bilak & Homiller, PLLC

(57) ABSTRACT

A method for reporting positioning data from a node B in a cellular communication system comprises performing (210), in a node B, of a measurement of a time of radio signal propagation concerning signalling with a first user equipment within a coverage of the node B. The measurement gives a time value. The time value is coded (212), in the node B, as a multi-symbol time report sequence. Auxiliary positioning information data concerning the first user equipment is obtained (214) in the node B. At least one symbol of the multi-symbol time report sequence is modified (216) (218) in the node B, for representing the auxiliary positioning information data. The modified multi-symbol time report sequence is reported from the node B. A positioning method, a node B and a positioning node are also disclosed.

36 Claims, 9 Drawing Sheets

(51) Int. Cl.
*G01S 5/02* (2010.01)
*G01S 5/12* (2006.01)
*G01S 5/14* (2006.01)

(58) Field of Classification Search
USPC .................................................. 370/310–350
See application file for complete search history.

(56) References Cited

U.S. PATENT DOCUMENTS

2008/0207226 A1* 8/2008 Shen et al. ................. 455/456.6
2010/0190509 A1* 7/2010 Davis ................. H04W 56/006
455/456.1

FOREIGN PATENT DOCUMENTS

| JP | 10327382 A | 12/1998 |
|---|---|---|
| JP | 2003533927 A | 11/2003 |
| JP | 2008233066 A | 10/2008 |
| WO | 9810569 A1 | 3/1998 |
| WO | 2010069610 A1 | 6/2010 |
| WO | 2010103990 A1 | 9/2010 |
| WO | 2011021792 A2 | 2/2011 |

OTHER PUBLICATIONS

Shen, Jiyun, et al. "Direction Estimation for Cellular Enhanced Cell-ID Positioning Using Multiple Sector Observations." 2012 International Conference on Indoor Positioning and Indoor Navigation (IPIN). Sep. 15-17. Zurich, Switzerland.

Unknown, Author. "3rd Generation Partnership Project; Technical Specification Group Core Network; Universal Geographical Area Description (GAD) (Release 6)." 3GPP TS 23.032 version 6.0.0 Release 6. Dec. 2004.

\* cited by examiner

POSITIONING IN WIRELESS COMMUNICATION SYSTEMS

TECHNICAL FIELD

The present invention relates in general to methods and devices for positioning in wireless communication systems, and in particular to methods and devices utilizing times of radio signal propagation for positioning purposes.

BACKGROUND

The Wideband Code Division Multiple Access (WCDMA) cellular system specified by the 3rd Generation Partnership Project (3GPP) provides a variety of location based services. These services all utilize the location of a user equipment (UE) for some purpose. Currently the most important service is the E-911 emergency positioning functionality that is regulated for the US market. E-911 phase 2 positioning requirements state that all cellular networks have to be able to position users within 30s, with accuracies better than 150 m (95%) and 50 m (67%), as counted for each county and each emergency center (PSAP). Considering the fact that the Global Positioning System (GPS) has very limited coverage indoors and the fact that most cell phone calls are today placed indoors, these are very difficult requirement. The consequence is that the WCDMA cellular system standardizes not only GPS, but actually assisted GPS (A-GPS) which is an enhancement of the GPS system. On top of that a number of alternative positioning methods that rely on cellular network measurements are standardized in WCDMA.

It can be noted that emergency positioning requirements are also under way in other regions, like e.g. India, However, in markets outside the US, cell phone positioning is primarily used for commercial location based services such as personal and vehicular navigation, friend finding and geographical search services. Lawful surveillance and intercept are other situations where location technology is particularly useful.

To support the positioning methods the whole cellular infrastructure is prepared for processing and signalling of geographical position information. In WCDMA most of the positioning related functionality resides in the radio access network (RAN) or closely associated with it, i.e. in the radio network controller (RNC) or the Stand-Alone Serving Mobile Location Centre (SAS) node, in the node B (the base station), and in the UE. The core network (CN) is mostly involved with the signalling of geographical information.

The cell ID positioning method that determines the terminal position with cell granularity represents the back bone low end approach in the majority of the cellular systems, including WCDMA. The method has the advantage of an instantaneous response and availability wherever there is cellular coverage.

Due to the advantages of the cell ID method, attempts have been made to enhance the accuracy, while maintaining the benefits. The most common way is to augment the cell ID method with an assessment of Round Trip Time (RTT), i.e. the travel time back and forth between the terminal and the base station. Together this defines a truncated circular strip around the base station.

In areas with relatively low expected density of WCDMA user equipments, the DL coverage, rather than the DL capacity, is typically the limiting factor. The base station and in particular the high power parts thereof are expensive parts of the communication radio access network and in order to save costs, a so-called psi-coverage configuration can be used. In such a configuration, a single node B is connected to three standard cross-polarized sector antennas. The DL signals are split into the three antennas. The connection is made via two specially designed 3-way splitter-combiners. In this way, a maintained DL coverage can be obtained, but with one node B instead of three.

However, to maintain the performance, the UL signals are received from multiple antenna branches and combined into one radio, using different frequencies for different sectors, thereby reducing interference and noise. The interference between the combined signals originating from different antennas can therefore be reduced. This results in an UL sensitivity comparable to an ordinary 3-sector configuration. Compared to an omni configuration the UL capacity is substantially improved.

Psi-coverage thus maps the DL and UL into one omni sector-cell, so the RNC views the configuration as a high capacity and high coverage omni sector-cell. In other words, the psi-coverage approach involves an omni base station with three antennas, stripped of some but not all three sector functionality. It is intended to have a very low cost, and good coverage. This allows the normal functioning of most RAN features. However, the positioning capabilities are limited, as only one cell area is defined in the RNC per omni sector-cell. In other words, the sector information is lost for positioning. The effect on RTT positioning is that the angular extension of the ellipsoid arc will be 360 degrees rather than about 120 degrees and the regions where the UE may be located becomes 3 times as large as if the sector of the UE would be known to the position calculation function of the RNC or SAS node. This represents a huge increase of the inaccuracy of the RTT positioning method, with a factor of 3. For such systems, the E-911 phase 2 positioning requirements become even more difficult to fulfil. Even though the node B has available auxiliary positioning information, a considerable rearranging of the RNC is today necessary for allowing such information to be utilised by positioning nodes in or connected to the RNC. Such rearranging is expensive and complex.

SUMMARY

An object of the present invention is to enable use of auxiliary positioning information available in a node B for positioning purposes without altering the basic radio network controller functionalities.

The above objects are achieved by methods and devices according to the enclosed independent patent claims. Preferred embodiments are defined by the dependent claims. In general words, in a first aspect, a method for reporting positioning data from a node B in a cellular communication system comprises performing, in a node B, of a measurement of a time of radio signal propagation concerning signalling with a first user equipment within a coverage of the node B. The measurement gives a time value. The time value is coded, in the node B, as a multi-symbol time report sequence. Auxiliary positioning information data concerning the first user equipment is obtained in the node B. At least one symbol of the multi-symbol time report sequence is modified in the node B, for representing the auxiliary positioning information data. The modified multi-symbol time report sequence is reported from the node B.

In a second aspect, a method for estimation of a position of a first user equipment in a cellular communication system comprises receiving, in a positioning node, of a multi-symbol time report sequence concerning the first user equipment from a node B to which the first user equipment is connected. The multi-symbol time report sequence is interpreted, in the positioning node, as a time of radio signal propagation concerning signalling with a first user equipment. At least one symbol of the multi-symbol time report sequence is furthermore interpreted as auxiliary positioning information data. A position of the first user equipment is estimated, in the positioning node, based on the time of radio signal propagation concerning signalling with the first user equipment and the auxiliary positioning information data.

In a third aspect, a node B in a cellular communication system comprises a timer, a report section and a control signalling section. The timer is configured for measuring a time of radio signal propagation concerning signalling with a first user equipment within a coverage of the node B. The measurement gives a time value. The report section is connected to the timer. The report section is configured for coding the time value as a multi-symbol time report sequence. The report section is further configured for obtaining auxiliary positioning information data concerning the first user equipment. The report section is also configured for modifying at least one symbol of the multi-symbol time report sequence for representing the auxiliary positioning information data. The control signalling section is connected to the report section. The control signalling section is configured for reporting the modified multi-symbol time report sequence.

In a fourth aspect, a positioning node in a cellular communication system comprises a receiver, an interpreter and a position estimator. The receiver is configured for receiving a multi-symbol time report sequence concerning a first user equipment. The interpreter is connected to the receiver. The interpreter is configured for interpreting the multi-symbol time report sequence as a time of radio signal propagation concerning signalling with a first user equipment. The interpreter is further configured for interpreting at least one symbol of the multi-symbol time report sequence as auxiliary positioning information data. The position estimator is connected to the interpreter. The position estimator is configured for estimating a position of the first user equipment based on the multi-symbol time report sequence and the auxiliary positioning information data.

One advantage with the present invention is that information, available in the node B, having potential to improve positioning can be transmitted and used in a positioning node without requiring intervention in the overall RNC configuration. No performance losses are caused, and no interoperability problems are introduced. Both positioning performed within the RNC and outside the RNC is possible to handle. Further advantages are described in connection with different embodiments in the detailed description below.

BRIEF DESCRIPTION OF THE DRAWINGS

The invention, together with further objects and advantages thereof, may best be understood by making reference to the following description taken together with the accompanying drawings, in which.

DETAILED DESCRIPTION

The design and configuration of communication systems of today are to a large portion determined by different standards. The standards are intended to assist in making the systems interoperable also when using nodes from different vendors and to make the systems back-compatible to a certain degree. One of the disadvantages with the standardizing work is that new ideas requiring changes in the standard are not very easily introduced.

Figure 1A:
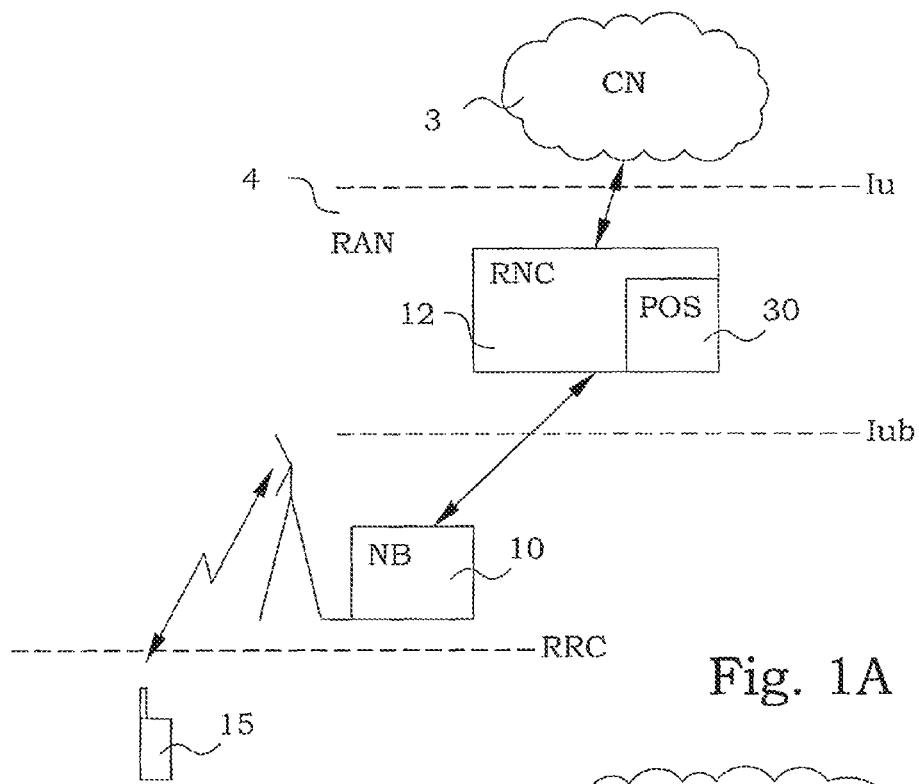
FIG. 1A is a schematic illustration of communication interfaces in a RNC centric architecture.

For example, in a WCDMA system of today, the RAN comprises different alternatives for positioning architectures. These are standardized by the 3GPP and are control plane positioning architectures. FIG. 1A illustrates a so-called RNC centric architecture.

The RNC 12 in the RAN 4 is the node where most if the positioning functionality is located in this architecture. This is illustrated by a positioning node 30. The RNC 12 receives positioning requests form the CN 30 over an Iu interface. The RNC 12 determines which positioning method to use to serve the request and orders measurements to be performed by the Node B 10 or the UE 15. The RNC 12 communicates with the Node B 10 over an Iub interface and the RNC 12 and the UE 15 communicates over an RRC interface, transparently via the Node B. The node B 10 performs certain position related measurements, e.g. like the RTT measurement, described further below. The UE 15 performs certain position related measurements like the UE RxTx measurement, also described further below. The results of these measurements are reported back to the RNC 12 over the standardized interfaces. The RNC 12 receives the measurement data and computes the location of the UE 15. If the CN 30 requested the positioning, the results are reported back to the CN 30.

Figure 1B:
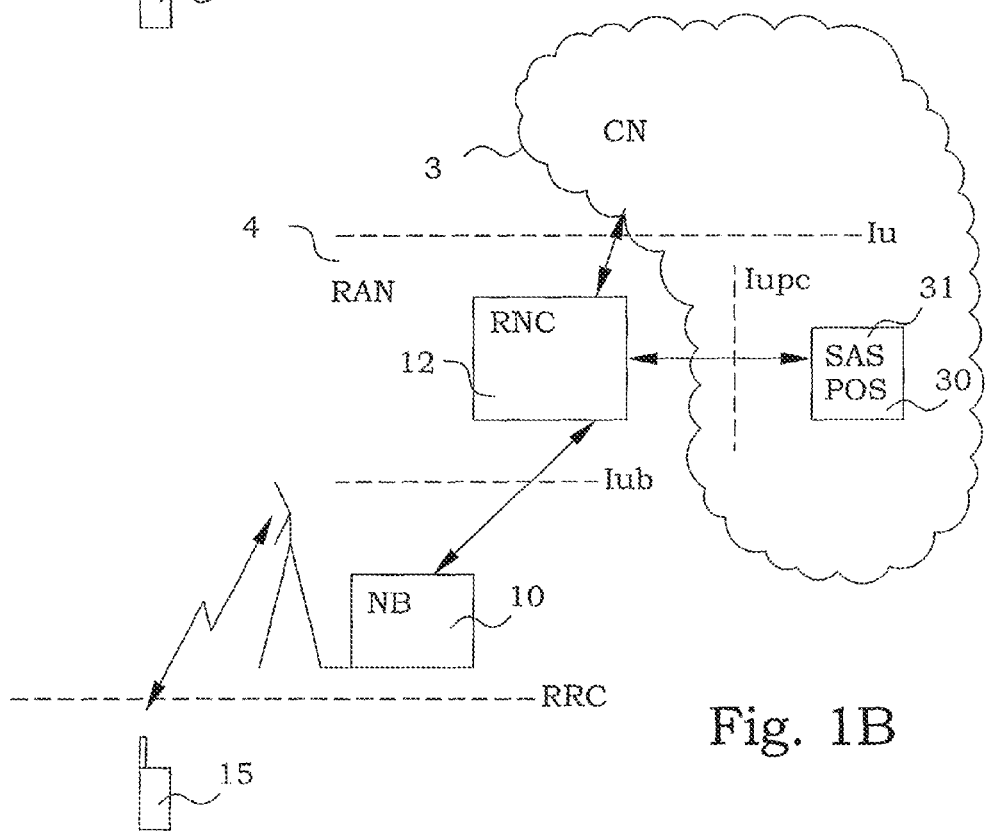
FIG. 1B is a schematic illustration of communication interfaces in a SAS centric architecture.

FIG. 1B illustrates another positioning architecture for a WCDMA RAN. This architecture is the so called SAS centric architecture. In this architecture, most of the positioning functionality is taken over by a separate positioning node 30, the broken out SAS node 31. The SAS node 31 communicates with the RNC over a standardized Iupc interface. The RNC 12 is left as a measurement and positioning reporting relay node. Otherwise the functionality is basically the same.

In both these architectures, the interfaces are standardized, defining what information can be exchanged and in what form. In most systems, a positioning method is available utilizing a time of radio signal propagation concerning signalling between a base station and a user equipment. For instance, in WCDMA, possibilities for RTT are given. To this end, the interfaces allow signalling of a multi-symbol time report sequence representing such a radio signal propagation time. In WCDMA, an RTT is possible to report between the Node B and the RNC over the Iub interface, and in case of a SAS centric architecture, the RTT is relayed onto the SAS over the Iupc interface.

In certain situations, of which some are discussed further below, the Node B may have access to auxiliary positioning information data concerning the UE that may be used to improve the accuracy of a positioning made on the radio signal propagation time. However, the standards do typically not provide for signalling of such auxiliary positioning information data. One way to solve this is to make an amendment to the standards. This is as mentioned above a slow process, may cause troubles with backwards compatibility and calls for expensive reprogramming.

In an alternative way the available report fields have to be used in an alterative manner. If such an alternative manner is used, this should not influence any other aspects of the configuration of the RNC. This approach is used by the present invention. It has been identified by the inventors that reporting of time values often are reported with an accuracy that is unnecessarily high. By utilizing some bits/symbols in such reports, auxiliary information may be transmitted from the Node B to a positioning node without "knowledge" of any relaying nodes, e.g. an RNC.

Proprietary signalling and new usage of existing signalling that allows a reporting of auxiliary positioning information is provided. In a WCDMA system, which allows for RTT positioning, bits of the RTT measurement report are used to encode e.g. an antenna sector associated with the UE in the message to the positioning node of the RNC sent over the Iub. In a SAS centric architecture, the bits of the RTT measurement report are further used to encode e.g. an antenna sector associated with the UE in the message from the RNC to the SAS positioning node over the Iupc.

The embodiments below will for simplicity utilize the WCDMA system and its provisions for RTT positioning as a basic model system. Antenna sectors will be used as the auxiliary positioning information data in the described embodiments. These are also the preferred embodiments, in which the advantages are believed to be most prominent. However, the ideas are not limited to such systems. The time of a radio signal propagation can also be other types of propagation time measurements, such as timing advance measurements or time of arrivals of radio signals, to be used in connection to e.g. Uplink Time Difference Of Arrival positioning. Also the auxiliary positioning information data can be of other types, such as beam forming data or data deduced from neighbour lists.

The present invention is operable in almost any wireless communication system allowing signalling of radio signal propagation times and having auxiliary positioning information data available in the node B. A typical example of such a wireless communication system is a system utilising psi-coverage. In such a system, the UL traffic is performed with separate antennas in different sectors and separate frequencies intended for the UL signals for the different antennas, while the DL traffic is performed with a single frequency for all antennas. In such a system, the auxiliary positioning information data may comprise an identification of an antenna sector within which said first user equipment is situated. This is achieved by identifying which antenna sector receives the UL traffic.

In the WCDMA standard, the RTT response report is a multi-bit time report sequence. However, in other systems, the time values of the radio signal propagation time can be coded as any type of multi-symbol time report sequence, where the different positions in the multi-symbol time report sequence may assume more than two different values.

In order to fully understand the advantages and possibilities of the embodiments of present invention described here below, one preferably needs some knowledge of the present standard positioning possibilities in WCDMA. Therefore, a short WCDMA positioning method overview will follow here.

The dominating high-accuracy positioning method in almost all modern cellular systems is the assisted GPS (A-GPS) method. A-GPS is an enhancement of the Global Positioning System (GPS). There GPS reference receivers attached to e.g. a cellular communication system collect assistance data that, when transmitted to GPS receivers in terminals connected to the cellular communication system, enhance the performance of the GPS terminal receivers. Additional assistance data is collected from the cellular communication system directly, typically to obtain a rough initial estimate of the position of the terminal together with a corresponding uncertainty of the initial estimate.

In a WCDMA system, having A-GPS implemented, the RNC acts as the node that collects, refines and distributes assistance data to the UEs. The CN requests positioning of a UE over a RANAP interface. In response, the RNC may use various kinds of A-GPS techniques, all these techniques do however build on assistance data being handled by a node in the cellular communication system. The RNC orders positioning measurements to be performed in the UE, measurements that are performed by dedicated A-GPS receiver hardware in the terminals. These receivers detect GPS transmissions from the satellites, typically denoted as space vehicles.

The cell ID positioning method that determines the terminal position with cell granularity represents the back bone low end approach in the majority of the cellular systems, including WCDMA. The method has the advantage of an instantaneous response and availability wherever there is cellular coverage.

Due to the advantages of the cell ID method, attempts have been made to enhance the accuracy, while maintaining the benefits. An advantageous way is to augment the cell ID method with an assessment of round trip time (RTT), i.e. the travel time back and forth between the terminal and the base station. Together, this defines a truncated circular strip around the base station, denoted an ellipsoid arc. RTT positioning as such is discussed further below.

Figure 2:
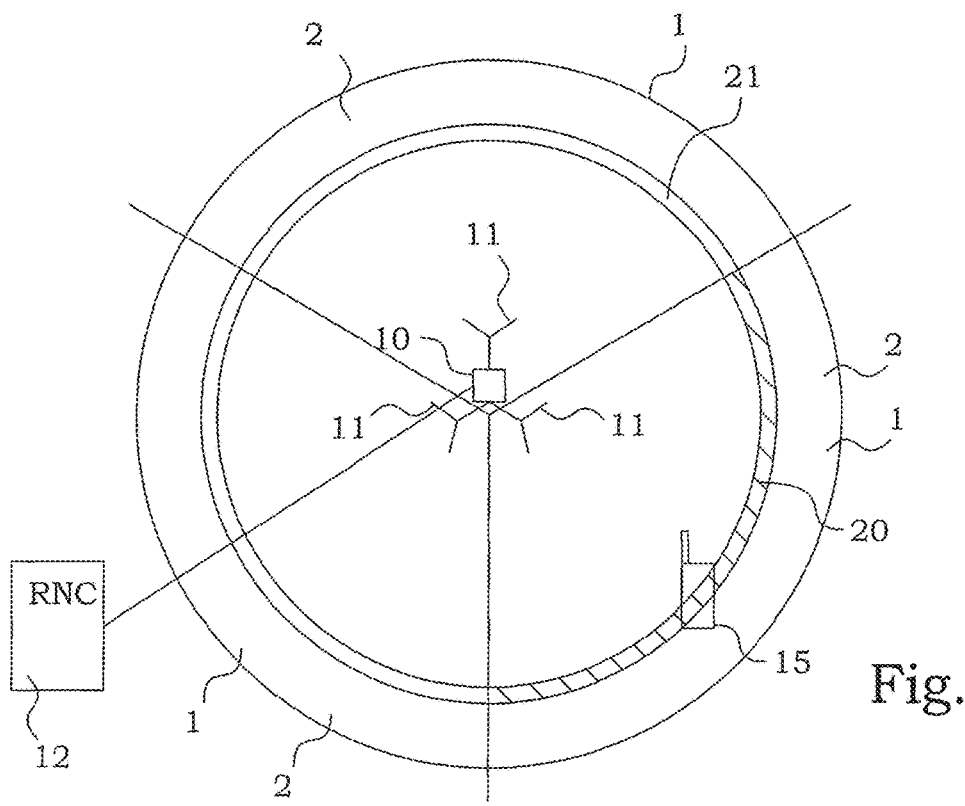
FIG. 2 is a schematic illustration of positioning by RTT augmented cell ID.

Positioning by RTT augmented cell ID can schematically be illustrated by FIG. 2. In this embodiment, a three sector antenna arrangement is described. A node B 10 is connected to the antennas 11. Each antenna covers a sector of about 120 degrees. The node B is associated with three cells 1 consisting of a 120 degree circular sector 2. The node B 10 is connected to an RNC 12, having positioning functionality. A user equipment 15 is present within the coverage of the node B. The RNC 12, orders the node B to perform a pathloss measurement to determine in which cell 1 the user equipment 15 is situated. The RNC then commands the node B 11 to perform an RTT measurement in the cell in which the user equipment 15 is situated and commands the user equipment 15 to measure the so-called RxTx time. Based on these measurements, a distance between the antenna and the user equipment 15 can be calculated as well as an uncertainty measure associated therewith. This distance and its uncertainty correspond to a circular strip 21 with a thickness corresponding to the uncertainty. By combining this information with the information about which cell the user equipment 15 is situated in, the position of the user equipment 15 can be restricted to a circular arc strip 20, illustrated by the hatched area.

The RTT distance computation relies on two measurements, the RTT measurement performed in the Node B and the UE RxTx type 1 measurement performed in the user equipment.

The RTT measurement has an accuracy of ½ chip (39 m) and a resolution of 1/16 chip (5 m). The range is 876.000 . . . 2923.8750 chips and the report values over Iub and Iur are 0-32767. The RTT measurement in the Node B measures the time between the beginning of a downlink WCDMA frame and the reception of the corresponding uplink frame.

The UE RxTx type 1 measurement measures the latency in the user equipment between reception of the beginning of a downlink frame and the transmission of the beginning of the corresponding uplink frame. The measurement has an accuracy of 1.5 chips and a resolution of 1 chip. The range is 768-1280 chips, corresponding to the reported values.

In positioning applications, the positioning method used by e.g. the RNC in a WCDMA RAN, determines the region where the terminal is located in terms of a region, expressed as one of a predetermined set of geometrical shapes. The selected geometrical shape is most often tied to the positioning method. The cell identity method e.g. naturally reports the position of the terminal with a polygon representing the cell extension, whereas the round trip time (RTT) positioning method naturally exploits the ellipsoid arc shape. The need for shape conversion functionality arises because the end user, to whom the determined position is reported, may prefer other position formats than generated by the applied positioning method. As an example an emergency centre may require that the location of the caller be presented as a circular confidence area at a given confidence level. However the output from many positioning methods is usually some other shape, like a polygon, an ellipsoid or a circular arc. Furthermore the provided shapes may correspond to different confidence levels.

A typical RTT positioning method exploits cell polygons to describe the extension of each cell of the cellular system. The WCDMA polygon format consist of a list of 3-15 corners, each corner being represented by an encoded latitude and longitude, in the WGS 84 system. When connected by line segments, the corners define a cell polygon which represents the cell boundary. Certain rules apply; line segments between corners are e.g. not allowed to cross.

The cell polygons can be computed by coverage computation tools which account for cell layout and topographical information. It is essential to understand that the cell polygons are statistical descriptions. This means that there is a certain probability that the terminal is actually located within the reported cell polygon. This is known as the confidence value.

In order to compute an ellipsoid arc corresponding to a position of a user equipment by means of enhancing a cell ID position with RTT data, cell polygons, antenna positions, the RTT measurement and the UE RxTx type 1 measurement are used. Such calculations comprise e.g. calculation of included and offset angles of an ellipsoid arc. A detailed description of such procedures is found in APPENDIX A.

Figure 3:
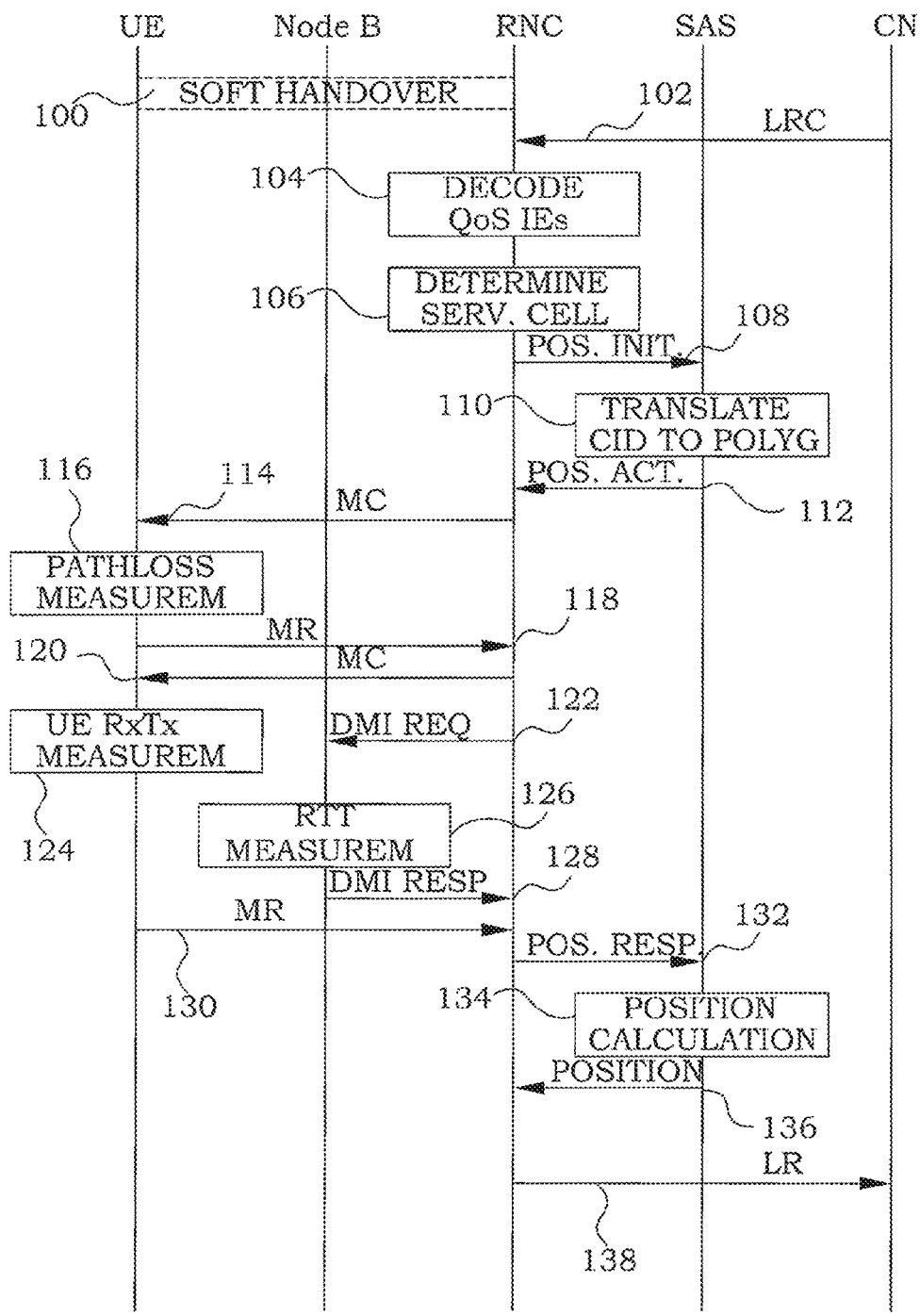
FIG. 3 is an illustration of a RTT procedure in a SAS centric architecture.

An example of an RTT positioning procedure in a serving RNC of a SAS centric architecture is displayed in FIG. 3. The procedure starts with the terminal (UE) being in soft handover 100. The serving RNC receives a positioning request 102 from the CN in a Location Reporting Control (LRC) message over the Iu interface. The serving RNC decodes 104 the message and stores the QoS information elements (IEs), namely response time, horizontal accuracy and vertical accuracy. It is assumed that RTT positioning is selected based on the requested QoS. A serving cell is determined 106 and a position initiation request message 108 is sent to the SAS-node. This message typically contains the UE capabilities, the CN request QoS parameters and the UTRAN cell identifier. The SAS fetches the cell polygon corresponding to the selected cell ID 110. The SAS signals a Position Activation Request message 112 to the RNC. The desired RTT method is signalled by the IE Selected Position Method set to Cell ID. Since the UE is in soft handover the best cell for single leg RTT positioning is determined as the cell of the active set with the smallest pathloss. Therefore a Measurement Control message 114 is sent to the UE. It is assumed that the UE is in state CELL_DCH. If this should not be the case, state change procedures apply. The UE performs 116 the pathloss measurements for the cells in the active set, and reports the result in two Measurement Report messages 118, of which the second is used to get the right filtering time. The RNC then orders the two measurements needed for RTT positioning, the UE RxTx measurement using a Measurement Control message 120 over RRC, and the RTT measurement using a Dedicated Measurement Initiation Request message 122 over Iub, possibly relayed over Iur. The measurements 124, 126 are then performed by the UE and the Node B. The results are reported back in a Dedicated Measurement Initiation Report message 128 and a Measurement Report message 130, respectively. The RNC compiles the UE and Node B measurements and sends a Position Activation Response message 132 to the SAS. The SAS proceeds by the position calculation 134. Following that step, a conversion of the ellipsoid arc reporting format to another shape may be performed. The SAS then evaluates the obtained QoS. The position, expressed as a geometrical area, is reported back to the RNC in a Position Initiation Response message 136. The procedure terminates after reporting the result back to the CN in a Location Report message 138 over Iu.

In a RNC centric architecture, the procedure is similar. However, here the positioning activities are performed in a positioning node of the RNC, which means that the signalling between the RNC and SAS can be omitted.

These basic procedures can be utilised also in a system according to the present invention. The differences are made internally in the procedures of the Node B and in the procedures of the positioning node, in the RNC or in the SAS. However, the RNC as such will not notice any differences, which means that no modification of the main RNC has to be performed. This facilitates the implementation of the present invention, since is operates with already existing RNC's. Furthermore, there are no interoperability problems in multi-vendor situations.

Figure 4:
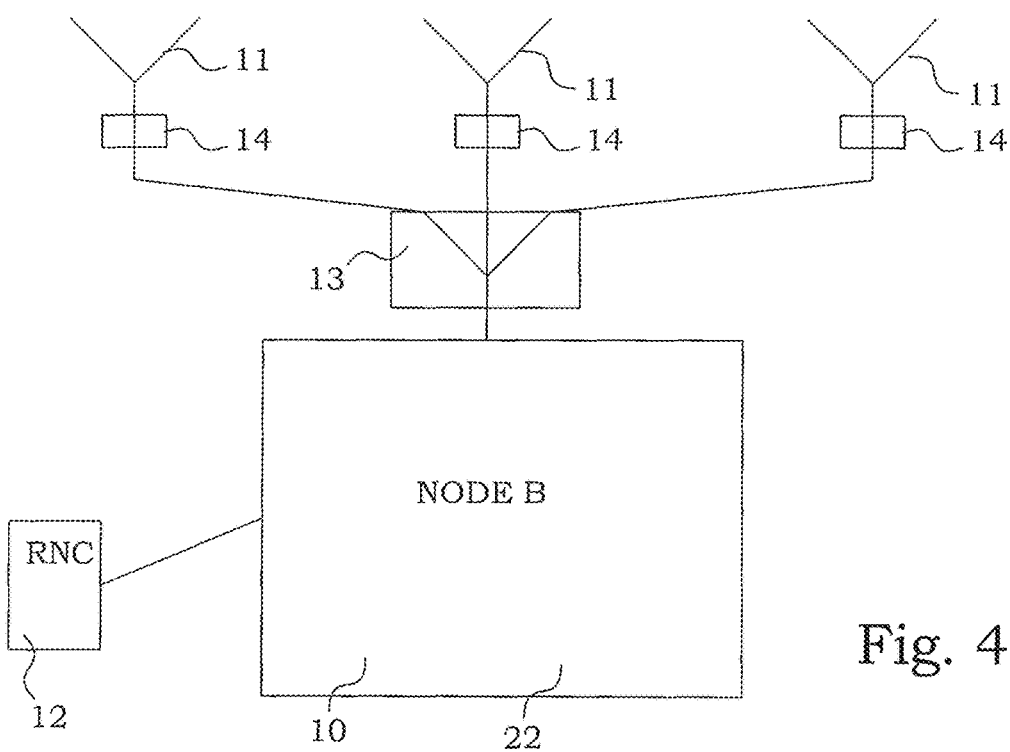
FIG. 4 is a schematic block diagram of a Node B in a psi-coverage system.

Although the present approaches can be applied in more general systems, the origin of the ideas was invented to solve the problems that appear in positioning in so-called psi-coverage systems. Therefore, a short introduction to an example of a typical psi-coverage system is given here. To reduce capital expenses (CAPEX) and maximize the usage of the radio capabilities, a single radio unit is used, with its DL signals being split into three antennas. This is schematically illustrated in FIG. 4. Essentially, a psi-coverage station 22, in the DL aspect, is an omni node B 10, stripped of some but not all three sector functionality. It uses the same carrier, the same scrambling code and ⅓ transmitted power to each of the three sector antennas 11. It is intended to have a very low cost, and good coverage. The Psi-coverage Node B 19 boosts the coverage of a single radio configuration, enabling it to provide like-for-like coverage with GSM for a limited number of WCDMA subscribers. Psi-Coverage is typically used when a single Node B 10 radio is connected to three standard cross-polarised sector antennas 11. The connection is typically made via specially designed 3-way splitter-combiners 13.

To maintain the performance, the UL signals are received from multiple antenna 11 branches and combined into one radio, with the software feature enabling decoding in a manner to offset the losses in the splitter-combiner 13. The software feature also reduces the interference between the combined signals originating from different antennas 11. One Tower Mounted Frequency shifting amplifier 14 (TMF) is installed between each antenna 11 and the splitter-combiners 13 for UL traffic. This results in an UL sensitivity comparable to an ordinary 3-sector configuration plus improved uplink capacity compared to an omni configuration. In other words, the UL of psi-coverage has 5 dB gain when compared to a plain 3-antenna splitter omni site, thanks to the frequency shift of the received signal on each TMF.

Figure 5:
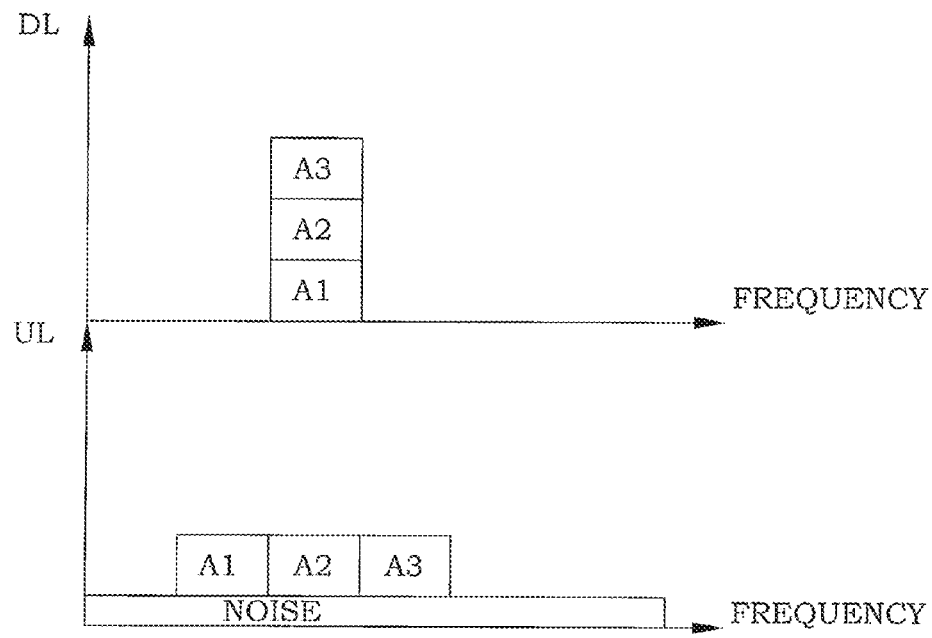
FIG. 5 are diagrams illustrating uplink and downlink signalling in a psi-coverage system.

The operation of the psi-coverage system can also be illustrated in the signalling frequency space, as in the diagram of FIG. 5. In the DL, the signals from the three antennas share the same carrier and the same scrambling code, as illustrated in the upper diagram. However, in the UL, the signals are frequency separated and may be treated as individual signals, as illustrated in the lower diagram.

Figure 6A:
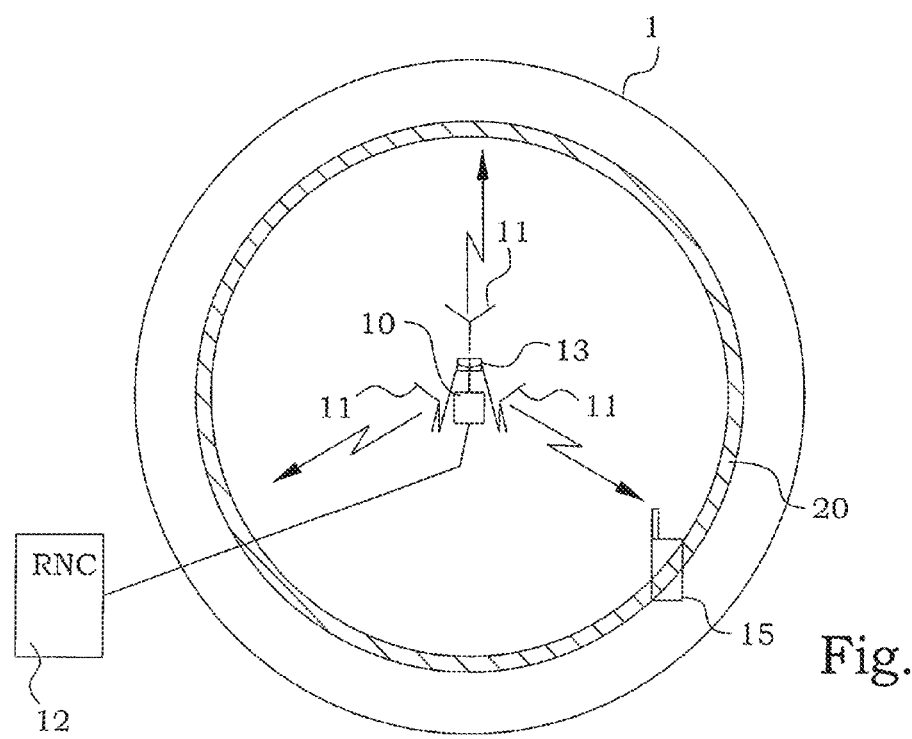
FIG. 6A is a schematic diagram illustrating the RTT augmented cell ID situation in a psi-coverage system.

Psi-coverage thus maps the DL and UL in one omni sector-cell, so the RNC views the configuration as one single high capacity and high coverage omni sector-cell. This allows the normal functioning of other RAN features but limits the positioning capabilities, as only one RTT measurement and only one cell polygon are configured in the RNC per omni sector-cell. This is illustrated in FIG. 6A. The RNC 12 experiences the psi-coverage system as a single cell, and a prior-art RTT enhanced cell-ID positioning will result in a positioning area corresponding to a full 360 degree circular ring.

Figure 6B:
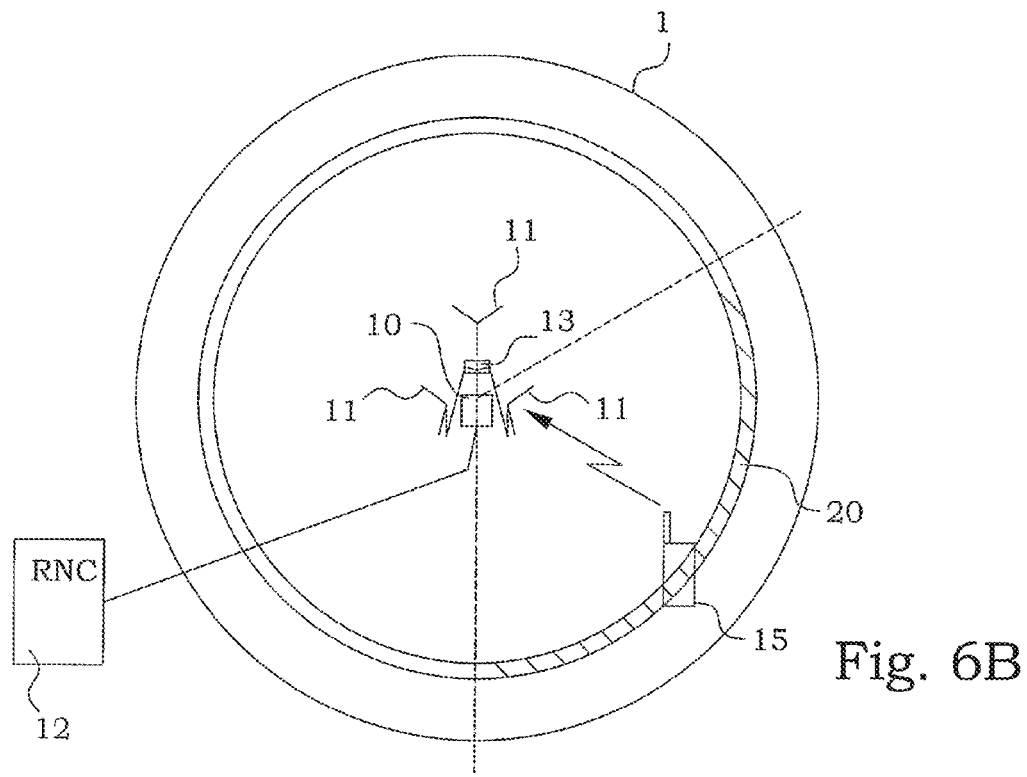
FIG. 6B is a schematic diagram illustrating the RTT augmented cell ID situation in a psi-coverage system if auxiliary positioning information data available in the Node B can be used.

In FIG. 6B, the UL situation is illustrated. The RNC still treats the psi-coverage system as a single cell. The Node B is indeed aware of in which sector the user equipment 15 is located in analogy with a standard three-sector system. However, since the RNC is configured for treating the psi-coverage system as a single cell, there are no prior art possibilities to communicate such information to the positioning node. The sectorized configuration of the UL is hidden to the RNC and nodes beyond it. It implies that the RNC and nodes beyond it will only be aware of one cell circumventing the Psi-coverage Node B. This means that the sector information is lost for positioning, although it is available internally in the Node B, something that makes RTT positioning in WCDMA at least three times less accurate as when this restriction is not in place.

Psi-coverage utilizes three sector antennas. It is of course possible to configure a system with any other number of antennas. One example is the Y-coverage system. Y-Coverage is typically presented as a reuse of the psi-coverage concept in sites where line-like coverage is enough i.e. along highways. Y-Coverage is used when a single Node B is connected to two sector antennas oriented in different directions. The connection is made via two specially designed 2-way splitter-combiners. The UL of Y-Coverage has 3 dB UL gain when compared to a 2-antenna splitter Coverage site, thanks to the frequency shift of the received signal on each TMF.

It would also be possible to use the present ideas in systems utilizing different kinds of beam forming strategies.

In the present invention, it is introduced to signal auxiliary positioning information data available in the Node B, e.g. antenna sector information, over the Tub and possibly also the Iupc interfaces to the positioning node. In the positioning node, the information becomes useful for positioning purposes. Such signaling should preferably be transparent for the remaining RNC functions.

In results of field trials of the RTT positioning algorithm, it was found that only 10% of the positionings have an accuracy better than 8 m, and only 5% better than 4 m. Hence accuracy impairments at that level are not noticeable for MT positioning performance. As stated above, the resolution is ¹⁄₁₆th of a chip. Since 1 chip single way corresponds to 78 m at 3.84 MHz, ¹⁄₁₆th of a chip corresponds to 4 m. Since the Rh measurement is divided by 2 in the position calculation, the distance associated with the least significant bit of the RTT measurement is 2 m. The conclusion is that it will not affect the RTT positioning accuracy significantly in case the 2 least significant bits are corrupt or altered in any other way. One possibility is therefore to utilize the bits for encoding of auxiliary positioning information, e.g. the sector information of the psiCoverage. Note that this also means that there will not be any problems in multi-vendor situations. The minor inaccuracy impairment introduced by altering these bits will pass unnoticed.

Figure 7A:
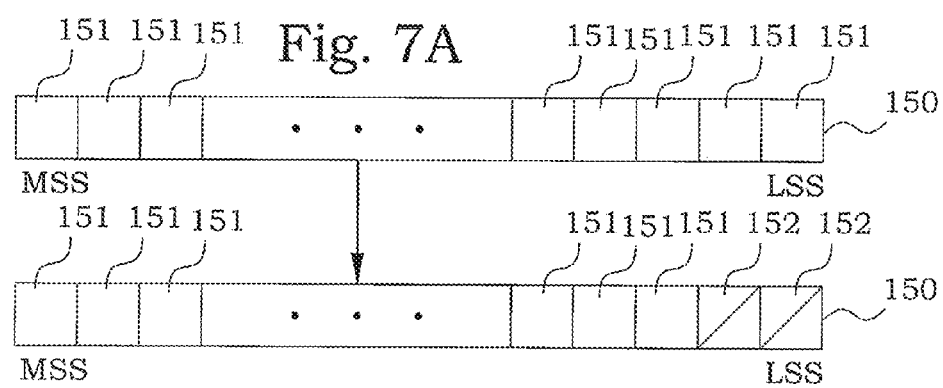
FIG. 7A is a schematic illustration of an embodiment of modifying a multi-symbol time report sequence.

In FIG. 7A, a multi-symbol time report sequence 150 is illustrated. This can e.g. be the reported RTT measurements reported over the Iub and/or the Iupc interfaces. The units 151, in a most general case, could be constituted by general symbols, e.g. representing values in a binary, hexadecimal or decimal manner. In a typical case, the symbols are binary bits. In a three sector antenna configuration, specification of a particular sector will need two binary bits. The multi-symbol time report sequence 150 thus represents a time value, e.g. a Dedicated Measurement Initiation Report message of an RTT measurement made by a Node B. By exchanging or modifying the two least significant symbols (LSS) or in this example least significant bits for a representation 152 of auxiliary positioning information data, the total value of the time value will be altered by such a small amount that the uncertainty of the final RTT evaluation will not be influenced, at least not significantly. The multi-symbol time report sequence 150 can be transmitted to the positioning node according to normal procedures and the mediating nodes will be totally unaware of the modified data. The receiving node can then interpret the multi-symbol time report sequence 150 in a new way and extract important auxiliary positioning information data therefrom.

In cases the auxiliary positioning information data needs more bits to be properly defined. In some situations more sectors than 3 may be used in the psiCoverage in future extensions. It may then be needed to use more bits than 2 to encode the sector information in the RTT measurement report, at the price of an increased RTT measurement inaccuracy. With 3 bits 8 sectors can be reported at the cost of an 8 m inaccuracy decrease, with 4 bits, 16 sectors can be encoded at the cost of a 16 m inaccuracy loss and so forth. It is anticipated that the gains associated with a better radial resolution at the cost of a loss of radial accuracy will persist up to accuracy losses corresponding to at least 5 bits, and significantly more in suburban and rural regions for which the psi-coverage and Y-coverage base stations are tailored. In Y-coverage systems, on the other hand, only 1 bit is necessary. In systems utilizing other symbols for the reporting, other number of modified symbols is optimum for the different applications.

In one embodiment, the signaling over the Iub interface may be performed according to the following. The two least significant bits are "stolen" and these for encoding of a psi-coverage sector information associated with the UE position. This particular embodiment uses:

Sector A: RTT_LSB=0, RTT_LSB+1=0.
Sector B: RTT_LSB=1, RTT_LSB+1=0
Sector C: RTT_LSB=0, RTT_LSB+1=1.

Other variants are of course also possible. The so modified and encoded RTT measurement is then transmitted over Iub interface (possibly relayed over Iur) as a part of the Dedicated Measurement Initiation Response message, to the positioning node in the RNC. The positioning node in the RNC then decodes the information and interprets the two LSB as follows:

```
If (RTT_LSB=0) & (RTT_LSB+1=0)
    psiCoverageSector = Sector A
Elseif (RTT_LSB=1) & (RTT_LSB+1=0)
    psiCoverageSector = Sector B
Elseif (RTT:LSB=0) & (RTT_LSB+1=1)
    psiCoverageSector = Sector C
End
```

The positioning node of the RNC may without significant loss of accuracy use the received encoded RTT measurement as is, or set LSB_0 and LSB_1 to 0.

In another embodiment, signaling over the Iupc interface is considered. The starting point is the encoded RTT measurement received over Iub (Iur) from the psi-coverage. The RNC compiles the UE and Node B measurements, modified according to the above principles and sends a Position Activation Response message to the SAS. The RTT measurements are then already modified according to the above principles. The SAS then decodes the information and interprets the two LSB as follows:

```
If (RTT_LSB=0) & (RTT_LSB+1=0)
    psiCoverageSector = Sector A
Elseif (RTT_LSB=1) & (RTT_LSB+1=0)
    psiCoverageSector = Sector B
Elseif (RTT:LSB=0) & (RTT_LSB+1=1)
    psiCoverageSector = Sector C
End
```

The SAS may without significant loss of accuracy use the received encoded RTT measurement as is, or set LSB_0 and LSB_1 to 0.

Figure 7B:
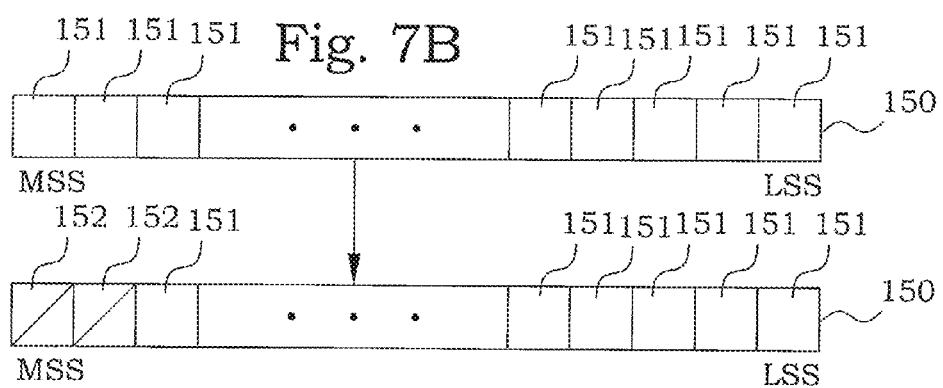
FIG. 7B is a schematic illustration of another embodiment of modifying a multi-symbol time report sequence.

Even if the least significant symbols are the most probable choice to use for incorporating auxiliary positioning information data, there are also other options. For example, in certain areas, the coverage of a cell may be much smaller than the maximum range that is possible to report by e.g. RTT. This means that the most significant symbols MSS, as in the example of FIG. 7B, or in a typical case the most significant bits always are represented by zeros. If the positioning node is configured to be aware of that the most significant bits always are zero, these bits can instead be used for conveying a representation 152 of auxiliary positioning information data.

A combination of the two approaches presented above can also be utilized, using symbols both at the MSS and LSS end.

Figure 8:
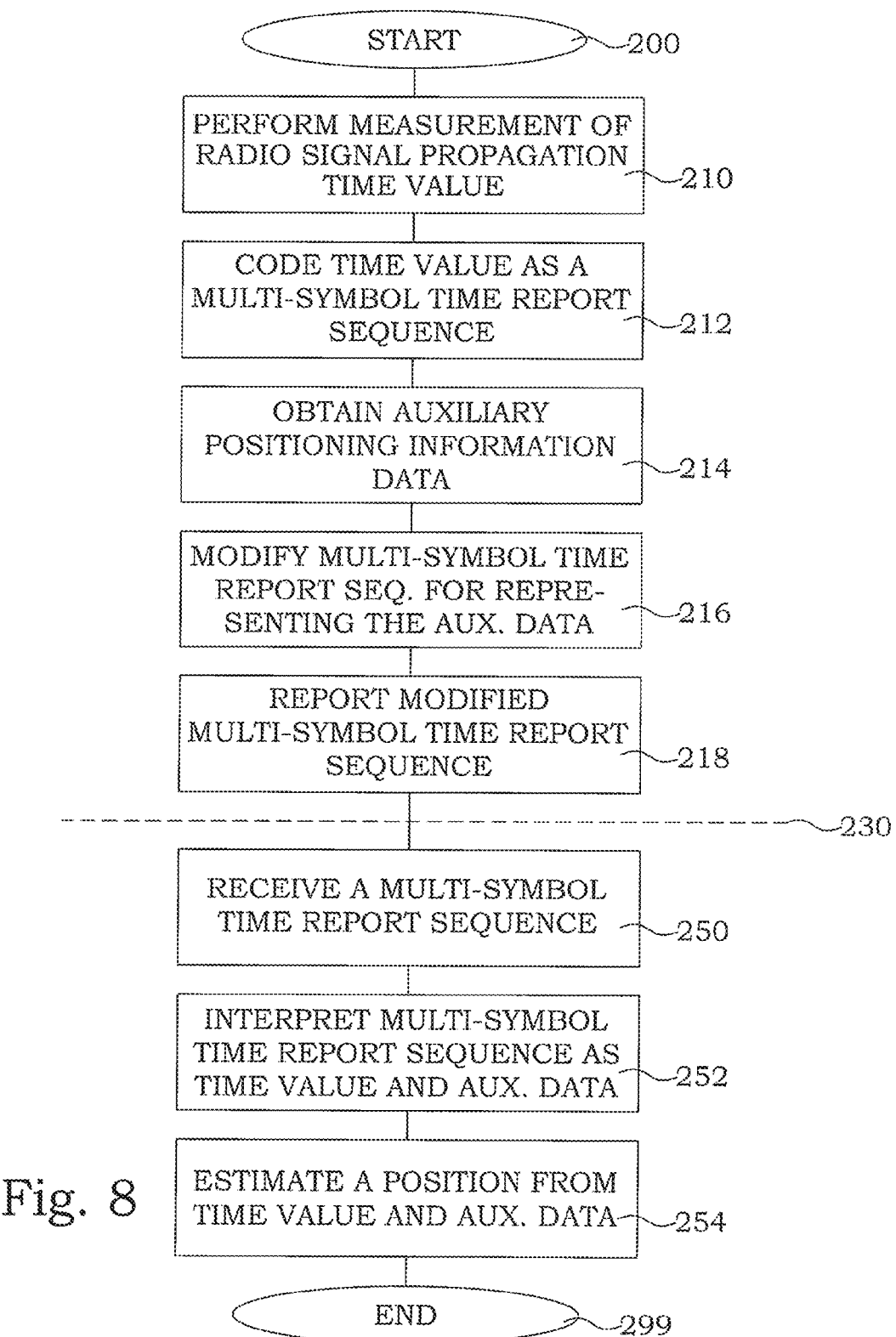
FIG. 8 is a flow diagram of steps of an embodiment of a positioning method.

FIG. 8 is a flow diagram illustrating steps of an embodiment of a positioning method. The flow can be divided in two parts, as illustrated by the broken line 230. An upper part is a method for reporting positioning data from a Node B in a cellular communication system. A lower part is a method for estimation of a position of a user equipment in a cellular communication system. The entire process starts in step 200. In step 210, performed in a node B, a measurement of a time of radio signal propagation concerning signalling with a first user equipment within a coverage of said base station is performed. This measurement gives a time value. The time value is in the node B in step 212 coded as a multi-symbol time report sequence. Auxiliary positioning information data concerning the first user equipment is obtained in the node B in step 214. In step 216, at least one symbol of the multi-symbol time report sequence is, in the node B, modified for representing the auxiliary positioning information data. The modified multi-symbol time report sequence is reported from the node B in step 218. This report is typically reported to a positioning node of the RNC or to an SAS (typically via an RNC).

In the method for estimation of a position of a first user equipment in a cellular communication system, the multi-symbol time report sequence concerning the first user equipment is in step 250 received in a positioning node. The multi-symbol time report sequence is originally provided by a node B to which the first user equipment is connected. The multi-symbol time report sequence may be compiled by an RNC if e.g. the positioning node is a SAS. In step 252, the multi-symbol time report sequence is interpreted in the positioning node as a time of radio signal propagation concerning signalling with the first user equipment, and at least one symbol of the multi-symbol time report sequence is interpreted as auxiliary positioning information data. A position of the first user equipment is estimated in the positioning node in step 254. The estimation is based on the time of radio signal propagation concerning signalling with the first user equipment and the auxiliary positioning information data. The estimation preferably comprises calculation of included and offset angles of an ellipsoid arc as described in Appendix A.

In a particular embodiment, the estimating comprises calculation of a position of the first user equipment based on the time of radio signal propagation concerning signalling with the first user equipment and refining of the calculated position by use of the auxiliary positioning information data. The calculation of included and offset angles of an ellipsoid arc is then preferably included in the refining of the calculated position.

In order to use the signalled psi-coverage sector information, polygons are preferably configured for all sectors of the psi-coverage or Y-coverage cells. This is made in a similar manner as in prior art and from the description of the position calculation of the RTT positioning method above.

One 3-15 corner polygon is typically configured in the positioning node of the RNC, for each sector of the psi-coverage or Y-coverage cells. In the case of a SAS centred configuration, one 3-15 corner polygon is typically configured in the SAS, for each sector of the psi-coverage or Y-coverage cells. Note that in this case it is also possible to have the sector polygons configured in the RNC. The RNC then selects the right sector and reports it to the SAS node as the cell polygon using the Position Activation Response message. Note that the signalling in this case needs to involve also a request message from the SAS.

The position calculation is performed as described in prior art, with the exception that sector polygons associated with the UE are used, rather than the entire cell polygon associated with the psi-coverage or Y-coverage base stations.

In a preferred embodiment, where the RTT positioning is utilized, a RxTx latency measurement has to be provided. The time of radio signal propagation concerning signalling with the user equipment is thus a round trip time. Preferably, such measurement handling as such can be performed as in prior art solutions. In such a case, the positioning node, either in the RNC or in the SAS orders the user equipment to perform a RxTx latency measurement and to report said RxTx latency in said RxTx latency report. Such an order is typically performed via the RNC routines as described before. A RxTx latency report comprising a representation of a RxTx latency from the first user equipment is obtaining in the positioning node. In alternative embodiments, the RxTx latency measurements can be ordered by other means, e.g. as a direct response on a positioning order from the CN. The RxTx latency could also be provided in other forms than as a report from the user equipment directed to the RNC and possible forwarded to an SAS. The RxTx latency could e.g. be ordered before the SAS is informed about the positioning request and be included e.g. in the Position Initiation Request, e.g. as a part of the UE capabilities. Independently on how the RxTx latency is achieved, the estimation of a position of the user equipment is further based on the RxTx latency.

Similarly, preferably, an order is sent to the node B for measuring the time of radio signal propagation concerning signalling with the user equipment. This order may be transmitted via the RNC. The order may also include an order for obtaining the auxiliary positioning information data and reporting the time of radio signal propagation concerning signalling with the first user equipment and the auxiliary positioning information data as the multi-symbol time report sequence. The order for obtaining the auxiliary positioning information data can also be implicit in the order of the RTT measurement, e.g. by configuring the Node B to interpret an RTT order in such a way.

In applications utilising RTT measurements, the Node B is similarly preferably adapted for handling necessary measurements. To this end, an order is received for measuring of the time of radio signal propagation concerning signalling with the user equipment from a positioning node. The reporting of the modified multi-symbol time report sequence is thereby performed directly or indirectly to the positioning node giving the order.

Figure 9:
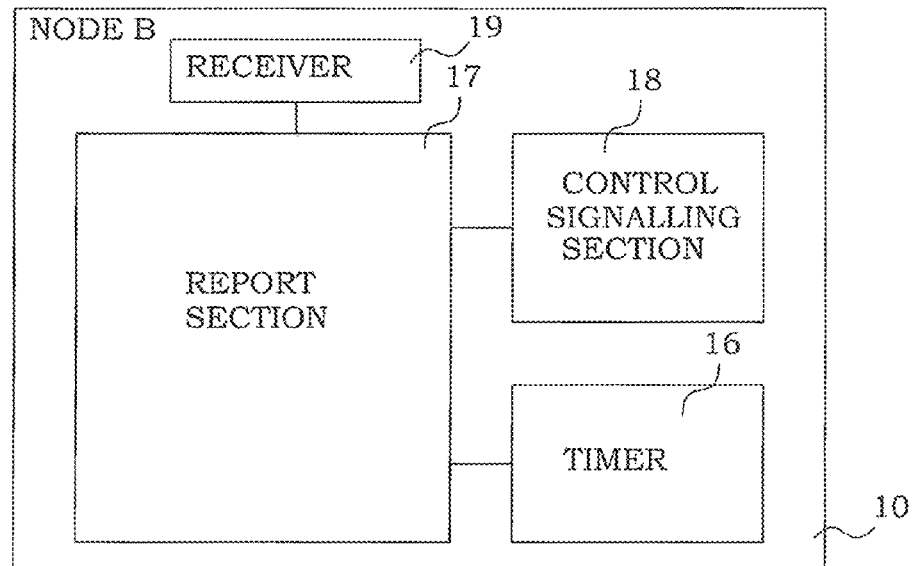
FIG. 9 is a block diagram of an embodiment of a Node B.

FIG. 9 illustrates a schematic block scheme of an embodiment of a Node B 10. The Node B comprises a timer 16, a report section 17 and a control signalling section 18. The timer 16 is configured for measuring a time of radio signal propagation concerning signalling with a user equipment within a coverage of the Node B. This measurement gives a time value. In a particular embodiment, the measurement is an RTT measurement. The report section 17 is connected to the timer. The report section 17 is configured for coding the time value as a multi-symbol time report sequence. This multi-symbol time report sequence may in particular embodiments be a Dedicated Measurement Initiation Report. The report section 17 is further configured for obtaining auxiliary positioning information data concerning the user equipment. The report section modifies at least one symbol of the multi-symbol time report sequence for representing the auxiliary positioning information data. The control signalling section 18 is connected to the report section 17 and is configured for reporting the modified multi-symbol time report sequence.

In a particular embodiment, the node B serves a plurality of antennas, and the auxiliary positioning information data comprises an identification of an antenna sector within which the first user equipment is situated. The plurality of antennas is operated together as an omni-antenna for downlink signalling.

In particular embodiments, the Node B further comprises a receiver 19 configured for receiving an order for the measuring of the time of radio signal propagation concerning signalling with the user equipment from a positioning node. The control signalling section 18 then configured for reporting the modified multi-symbol time report sequence to the positioning node in question.

Figure 10A:
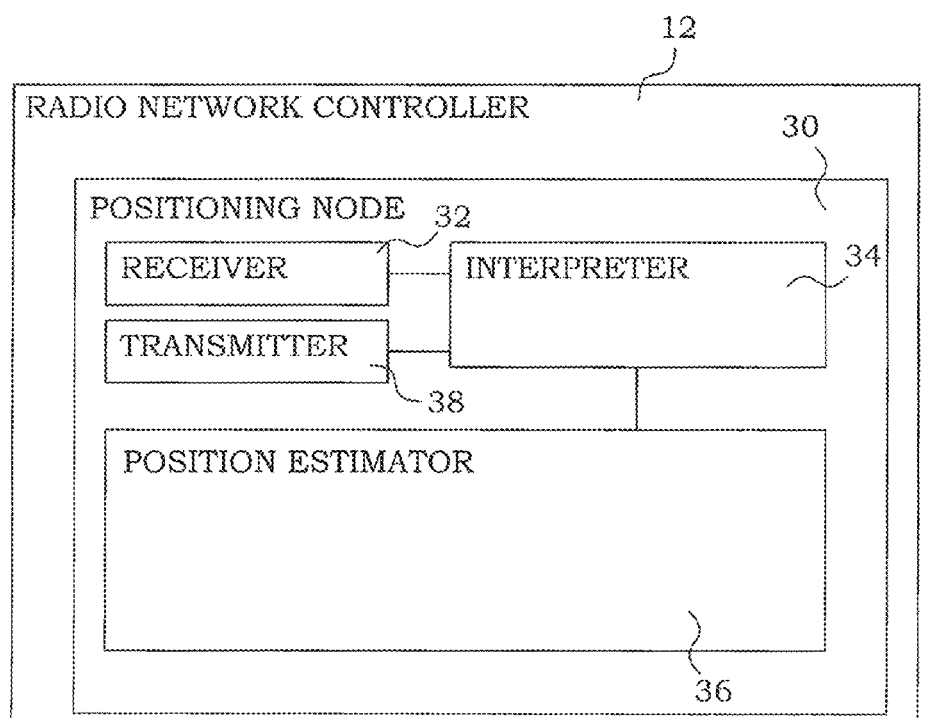
FIG. 10A is a block diagram of an embodiment of a positioning node in an RNC.

FIG. 10A is a schematic block scheme of an embodiment of a positioning node in a cellular communication system. In this embodiment, the positioning node 30 is comprised in an RNC 12. The positioning node 30 comprises a receiver 32, an interpreter 34 and a position estimator 36. The receiver 32 is configured for receiving a multi-symbol time report sequence concerning a user equipment. In a particular embodiment, the multi-symbol time report sequence concerns an RTT measurement. The interpreter 34 is connected to the receiver 32. The interpreter 34 is configured for interpreting the multi-symbol time report sequence as a time of radio signal propagation concerning signalling with a first user equipment. The interpreter 34 is also configured for interpreting at least one symbol of the multi-symbol time report sequence as auxiliary positioning information data. The position estimator 36 is connected to the interpreter 34. The position estimator 36 is configured for estimating a position of the user equipment based on the time of radio signal propagation concerning signalling with a first user equipment and the auxiliary positioning information data. In a particular embodiment, the position estimator 34 is configured for calculating a position of the user equipment based on the multi-symbol time report sequence, and for refining the so calculated position by use of the auxiliary positioning information data.

In embodiments, where the time of radio signal propagation concerning signalling with a first user equipment is a round trip time, the receiver 32 is further configured for obtaining a RxTx latency report. The RxTx latency report comprises a representation of a RxTx latency measurement. The RxTx latency report is achieved directly or indirectly from the user equipment. The position estimator 36 is in such an embodiment preferably configured for estimating a position of the user equipment further based on the RxTx latency.

In a particular embodiment, the positioning node 30 further comprises a transmitter 38. The transmitter 38 is configured for sending an order to the node B, directly or indirectly, for measuring the time of radio signal propagation concerning signalling with the user equipment. The order preferably also comprises an order for obtaining the auxiliary positioning information data and for reporting the time of radio signal propagation concerning signalling with the user equipment and the auxiliary positioning information data as the multi-symbol time report sequence.

In a further preferred embodiment, the transmitter 38 is configured for ordering the user equipment to perform a RxTx latency measurement, either directly or indirectly. The order comprises preferably also an order to report the RxTx latency in the RxTx latency report.

In particular embodiments, the cellular communication system comprises base stations that serve a respective plurality of antennas, and the auxiliary positioning information data comprises then preferably an identification of an antenna sector within which the user equipment is situated. The plurality of antennas is operated together as an omni-antenna for downlink signalling.

Figure 10B:
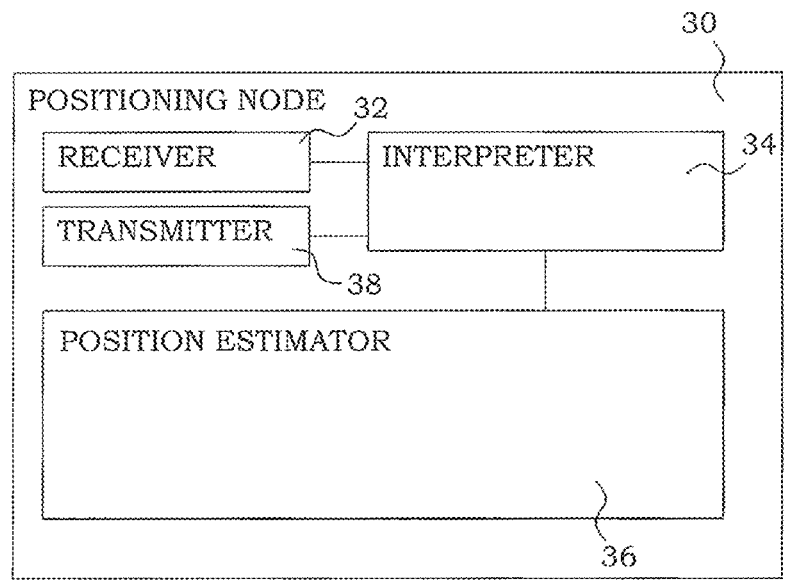
FIG. 10B is a block diagram of an embodiment of an external positioning node.

In FIG. 10B, another embodiment of a positioning node 30 is illustrated. This positioning node 30 is a separate node connected to a radio network controller, e.g. a SAS node.

Figure 11A:
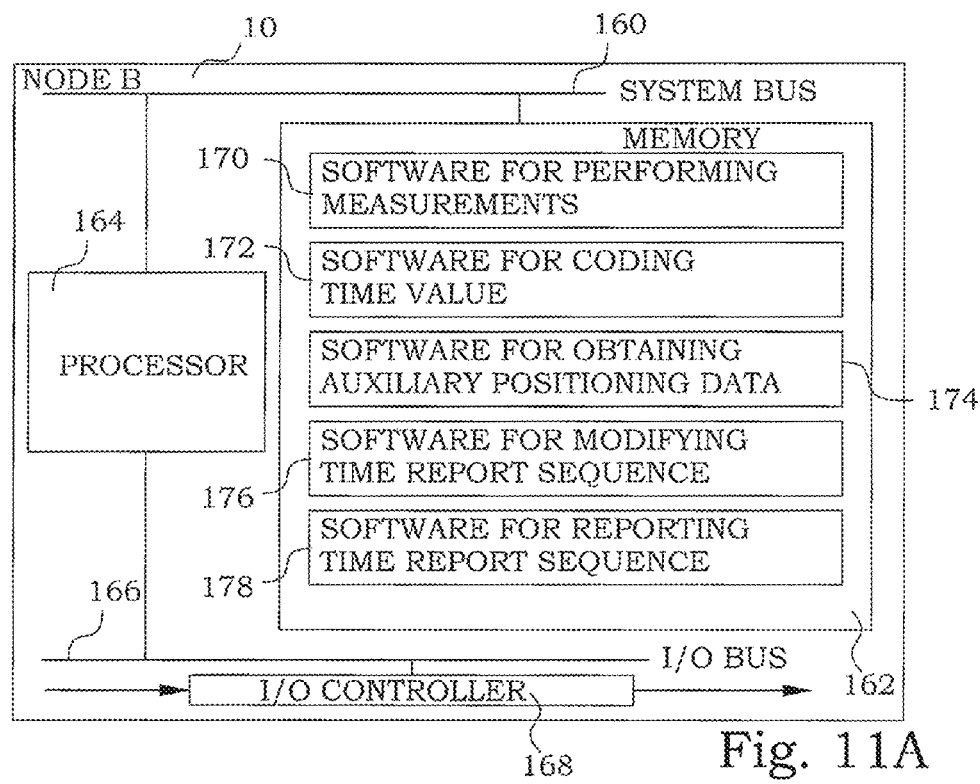
FIG. 11A illustrates an embodiment of an implementation of a Node B.

As an implementation example, FIG. 11A is a block diagram illustrating an example embodiment of a node B 10. This embodiment is based on a processor 164, for example a micro processor, a memory 162, a system bus 160, an input/output (I/O) controller 168 and an I/O bus 166. In this embodiment the orders and communication from the RNC as well as signaling from the user equipments are received by the I/O controller 168 are stored in the memory 162. The I/O controller 168 also controls the issue of the measurement signaling to the user equipment as well as reports to the RNC. The processor 164 executes a software component 170 for performing measurements of a time of radio signal propagation concerning signalling with a user equipment, a software component 172 for coding the time value as a multi-symbol time report sequence, a software component 174 for obtaining auxiliary positioning information data concerning said first user equipment, a software component 176 for modifying at least one symbol of said multi-symbol time report sequence for representing the auxiliary positioning information data and a software component 178 for reporting the modified multi-symbol time report sequence. This software is stored in the memory 162. The processor 164 communicates with the memory 162 over the system bus 160. Software component 170 may implement the functionality of block 16 in the embodiment of FIG. 9. Software components 172, 174 and 176 may implement the functionality of block 17 in the embodiment of FIG. 9. Software component 178 may implement the functionality of block 18 in the embodiment of FIG. 9.

Figure 11B:
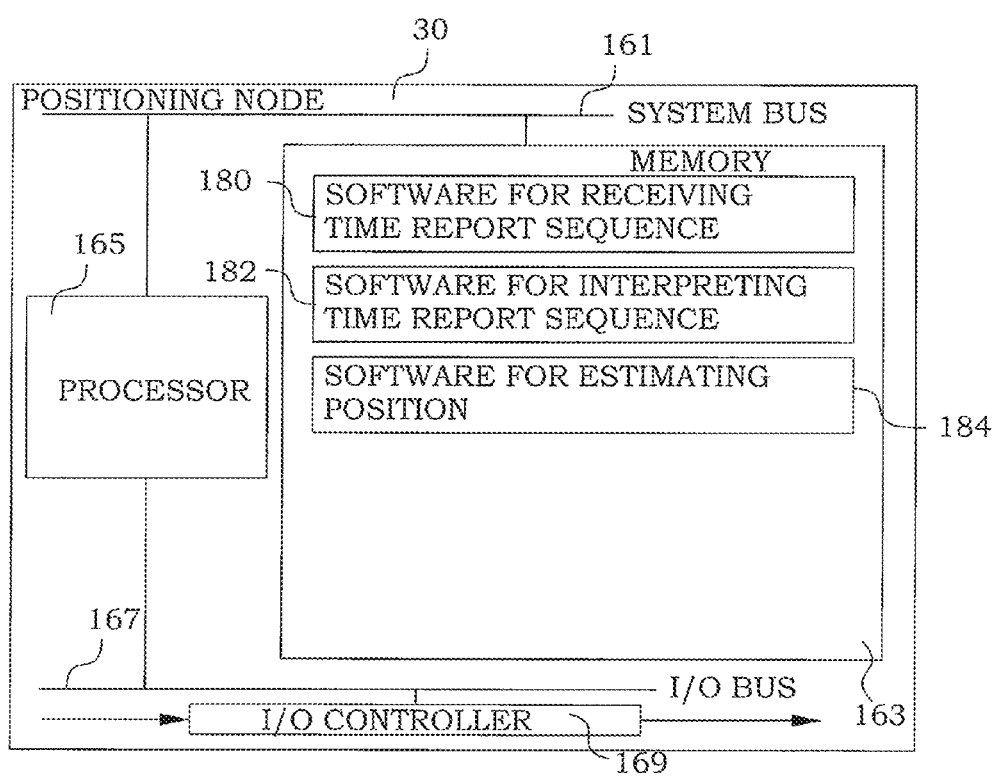
FIG. 11B illustrates an embodiment of an implementation of a positioning node.

As an implementation example, FIG. 11B is a block diagram illustrating an example embodiment of a positioning node 30. This embodiment is based on a processor 165, for example a micro processor, a memory 163, a system bus 161, an input/output (I/O) controller 169 and an I/O bus 167. In this embodiment the communication to and/or from the CN, node B's and RNC (in case of a SAS centric architecture) is transmitted/received by the I/O controller 169 and suitable data are stored in the memory 163. The processor 165 executes a software component 180 for receiving a multi-symbol time report sequence concerning a user equipment from a node B to which the user equipment in question is connected, a software component 182 for interpreting the multi-symbol time report sequence as a time of radio signal propagation concerning signalling with the user equipment, and at least one symbol of the multi-symbol time report sequence as auxiliary positioning information data, and a software component 184 for estimating a position of the user equipment based on the time of radio signal propagation concerning signalling with a first user equipment and the auxiliary positioning information data. This software is stored in the memory 163. The processor 165 communicates with the memory 163 over the system bus 161. Software component 180 may implement the functionality of block 32 in the embodiments of FIGS. 10A-B. Software component 182 may implement the functionality of block 34 in the embodiments of FIGS. 10A-B. Software component 184 may implement the functionality of block 36 in the embodiments of FIGS. 10A-B.

From the above description, it is understood that the advantages with the present invention are large. At least 3 times better accuracy of the RTT positioning function is obtained as compared to the situation without the invention in a psi-coverage system. No performance loss in the distance determination of the RTT is experienced for reasonable bit usage. There are furthermore no interoperability problems in multi-vendor situations. The solutions are capable of handling both RNC centric and SAS centric architectures.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

Appendix A

An enabling description of a computation of a position of a user equipment by means of enhancing a cell ID position will be presented here below.

Cell polygons, antenna positions, the RTT measurement and the UE RxTx measurement first need decoding. When describing this, the subscript$_{enc}$ denotes an encoded quantity. Starting with the configured antenna position, the latitude $\theta^A$ and longitude $\phi^A$ are obtained as follows:

$$\theta^A = (1 - 2(\text{sign(latitude)})^A_{enc})\theta^A_{enc} \frac{\pi}{2^{24}} \tag{A1}$$

$$\varphi^A = \varphi^A_{enc} \frac{\pi}{2^{23}} \tag{A2}$$

Here $(\text{sign(latitude)})_{enc}^A$ equals 0 in the Northern hemisphere and 1 in the Southern hemisphere]. The latitudes $\theta_i^P$ and longitudes $\phi_i^P$ of the configured cell polygon corners are obtained in the same way, i.e.:

$$\theta_i^P = (1 - 2(\text{sign(latitude)})^P_{enc,i})\theta^P_{enc,i} \frac{\pi}{2^{24}}, \tag{A3}$$

$$i = 1, \ldots, N^P,$$

$$\varphi_i^P = \varphi^P_{enc,i} \frac{\pi}{2^{23}}, \tag{A4}$$

$$i = 1, \ldots, N^P.$$

The number of polygon corners are denoted $N^P$. The decoding of the RTT measurement, RTT, is obtained as:

$$RTT = \left(\frac{RTT_{enc}}{16} + 875.968\right)T_{chip}. \tag{A5}$$

$T_{chip} = 1/3840000$ s is the chipping time. The division by 16 follows since the resolution of the measurement is $1/16$ chip. The decoding of the UE RxTx type 1 measurement, RxTx, follows as:

$$RxTx = RxTx_{enc}T_{chip}. \tag{A6}$$

In case measurement values on the range limits are obtained, the measurement is declared a failure and the RTT positioning method is terminated.

Coordinate transformations are performed as follows. The calculation of the offset and included angles of the ellipsoid arc format needs to be performed in a Cartesian, earth tangential coordinate system. The latitude and longitudes of the antenna position and cell polygon are therefore transformed to such a system, with the origin located in the antenna coordinates of the RBS. A transformation from WGS 84 geodetic latitudes and longitudes to an Earth Centered Earth Fixed (ECEF) system is first performed. Such coordinates are denoted with the subscript$_{ECEF}$. After that the transformation to the Earth tangential east-north(-up) system, marked with the subscript$_{ET}$, can be performed.

A transformation from geodetic coordinates to Earth Centered Earth Fixed (ECEF) Cartesian coordinates follows:

$$N^A = \frac{a}{\sqrt{1 - e^2(\sin(\theta^A))^2}} \quad (A7)$$

$$x^A_{ECEF} = N^A \cos(\theta^A)\cos(\varphi^A) \quad (A8)$$

$$y^A_{ECEF} = N^A \cos(\theta^A)\sin(\varphi^A) \quad (A9)$$

$$z^A_{ECEF} = \left(\frac{b}{a}\right)^2 N^A \sin(\theta^A) \quad (A10)$$

$$N^P_i = \frac{a}{\sqrt{1 - e^2(\sin(\theta^P_i))^2}}, \quad (A11)$$
$$i = 1, \ldots, N^P$$

$$x^P_{ECEF,i} = N^P_i \cos(\theta^P_i)\cos(\varphi^P_i), \quad (A12)$$
$$i = 1, \ldots, N^P$$

$$y^P_{ECEF,i} = N^P_i \cos(\theta^P_i)\sin(\varphi^P_i), \quad (A13)$$
$$i = 1, \ldots, N^P$$

$$z^P_{ECEF,i} = \left(\frac{b}{a}\right)^2 N^P_i \sin(\theta^P_i), \quad (A14)$$
$$i = 1, \ldots, N^P.$$

In (A7)-(A14), a is the major axis of the WGS 84 Earth ellipsoid, b is the minor axis, and e is the eccentricity.

The polygon corner coordinates can now be transformed to the Earth Tangential system, with the origin in the antenna of the Node B and with east and north axes. Geometrical considerations give the following equations:

$$x^P_{ET,i} = -\sin(\varphi^A)(x^P_{ECEF,i} - x^A_{ECEF}) + \cos(\varphi^A)(y^P_{ECEF,i} - y^A_{ECEFhu\,A}), i=1,\ldots,N^P \quad (A15)$$

$$y^P_{ET,i} = -\sin(\theta^A)\cos(\varphi^A)(x^P_{ECEF,i} - x^A_{ECEF}) - \sin(\theta^A)\sin(\varphi^A)(y^P_{ECEF,i} - y^A_{ECEF}) + \cos(\theta^A)(z^P_{ECEF,i} - z^A_{ECEF}), i=1,\ldots,N^P. \quad (A16)$$

Distance calculation is made according to the following. The inner radius of the ellipsoid arc can then be calculated. Since the combined one way nominal accuracy of the RTT and UE RxTx type 1 measurement is 1 chip, the inner radius is adjusted to a value ½ chip less than the measured value. With c denoting the speed of light, the inner radius is:

$$R_{ET} = (RTT - RxTx - T_{chip})\frac{c}{2}. \quad (A17)$$

Due to measurement errors, negative radii may occur. Such results are modified to zero unless they are below a threshold, in which case a measurement failure is declared and the RTT positioning method is terminated.

No measurement of the thickness of the ellipsoid arc, $\Delta R_{ET}$, is available in the standard. Therefore this quantity is computed from a configurable uncertainty time, $T_{\Delta R_{ET}}$ [chips], determined by the field trial results, and from an upper bound on the drift between the uplink and the downlink. The measurement of RTT in the RBS and the measurement of RxTx in the UE are not synchronized. Hence the time difference between these two measurements multiplied with the maximum drift rate between the uplink and the downlink results in an upper bound on the drift in chips. The maximum drift rate is specified to be 1.25 chips/s. The time difference between the two measurements can be obtained by sampling of the timers $T_{UE}$ and $T_{RTT}$ as:

$$\Delta R_{ET} = (T_{\Delta R_{ET}} + 1.25|T_{RTT} - T_{UE}|)\frac{cT_{chip}}{2}. \quad (A18)$$

Ellipsoid Arc Calculation, i.e. Fusion with Cell Polygon is performed according to the following. The Node B antenna centre point, the inner radius and the thickness of the ellipsoid arc are now computed. This defines a region denoted a circular strip that extends 360 deg around the Node B. It then remains to compute the offset angle, $y_{ET}$, and the included angle, $\delta_{ET}$, that determine the lateral extension of the ellipsoid arc. $y_{ET}$ is defined to be the angle, counted clockwise from north to the point where the circular strip intersects the cell polygon. $\delta_{ET}$ is counted clockwise from the offset angle, to the point where the circular strip stops intersecting the cell polygon.

To compute $y_{ET}$ and $\delta_{ET}$, test points are distributed uniformly within the circular strip. The number of test points is 180, corresponding to the 2 degree angular quantization. Next, for each test point, it is checked if it is in the interior of the cell polygon. The test exploits a test ray from the test point to infinity parallel to the east axis of the coordinate system. The test is based on the fact that for test points in the interior, the cell polygon must be intersected an odd number of times, when the test ray moves from the test point to infinity. Formally, an assumption that the polygon is compact (finite) is also needed. The crossings with the polygon boundary are easily determined by checking for intersections between the test ray, and the line segments between two adjacent cell polygon corner points. The algorithm described below assumes that the first and last polygon corner points are the same (duplicated). For this reason (A15) and (A16) are augmented with $x_{ET,N^P+1} = x_{ET,1}^P$ and $y_{ET,N^P+1}^P = y_{ET,1}^P$. To explain the algorithm, the intersection between the horizontal ray $y=y_0$, $x \geq x_0$, and the line segment between the corners with index i and i+1 of the cell polygon, is given by the solution (if it exists) to the equation:

$$\begin{pmatrix} x \\ y \end{pmatrix} = \alpha \begin{pmatrix} x^P_{ET,i+1} \\ y^P_{ET,i+1} \end{pmatrix} + (1-\alpha)\begin{pmatrix} x^P_{ET,i} \\ y^P_{ET,i} \end{pmatrix}, \quad (A19)$$

$$x \geq x_0, 0 \leq \alpha < 1.$$

The solution to this equation, with a test point $(x_{test,k}\ y_{test,k})^T$, $k=1, \ldots, 180$ replacing the left hand side, and with consideration of the two constraints, renders an intersection if it exists. Repetition of this procedure for all line segments between corners hence allows for a count of the number of intersections for one specific test point. The complete procedure is summarized by the following algorithm, where $I_k$ denotes the number of intersections for test point k, and where inside$_k$ is a Boolean that is true if test point with index k is in the interior of the cell polygon:

$$x_{test,k} = \left(R_{ET} + \frac{cT_{chip}}{2}\right)\sin\left((k-1)\frac{2\pi}{180}\right), k = 1, \ldots, 180$$

$$y_{test,k} = \left(R_{ET} + \frac{cT_{chip}}{2}\right)\cos\left((k-1)\frac{2\pi}{180}\right), k = 1, \ldots, 180.$$

```
for k = 1 to 180
    I_k = 0
    for i = 1 to N^P
        if y_{ET,i}^P = y_{ET,i+1}^P - modify if segment is horizontal
            y_{ET,i+1}^P = y_{ET,i+1}^P + 0.01
        end
```

$$\alpha_{k,i} = \frac{y_{test,k} - y_{ET,i}^P}{y_{ET,i+1}^P - y_{ET,i}^P}$$

$$\bar{x} = x_{ET,i}^P + \alpha_{k,i}(x_{ET,i+1}^P - x_{ET,i}^P)$$

```
        if (x̄ - x_{test,k} > 0) & (0 ≤ α < 1) – check constraints
            I_k = I_k + 1
        end
    end
    if (I_k mod 2 = 1) – check if I_k is odd                    (A20)
        inside_k = 'true'
    end
```

The algorithm (A20) hence marks each test point as interior or exterior to the cell polygon. In order to find the sought angles, a search is then performed for the largest set of adjacent test points that are exterior to the cell polygon. The complement to this set constitutes the set of test points that defines the ellipsoid arc. Note that this procedure handles the case with more than one intersection between the circular strip and the cell polygon. There is also special handling of cases where there is no intersection, then a 360 degree ellipsoid arc results. The result is summarized in the offset angle $\omega_{offset}$, and the included angle $\omega_{included}$.

The encoding is performed according to:

$$ellipsoidArc(1) = 10 - \text{shape code} \quad (A21)$$

$$ellipsoidArc(2) = (\text{sign(latitude)})_{enc}^A \quad (A22)$$

$$ellipsoidArc(3) = \theta_{enc}^A \quad (A23)$$

$$ellipsoidArc(4) = \varphi_{enc}^A \quad (A24)$$

$$ellipsoidArc(5) = \max\left(\min\left(\text{floor}\left(\frac{R_{ET}}{5}\right), 65535\right), 0\right) \quad (A25)$$

$$ellipsoidArc(6) = \min\left(\text{floor}\left(\frac{^{10}\log\left(1 + \frac{\Delta R_{ET}}{10}\right)}{^{10}\log(1.1)}\right), 128\right) \quad (A26)$$

$$ellipsoidArc(7) = \max\left(\text{floor}\left(\frac{\omega_{offset}}{2}\right), 0\right) \quad (A27)$$

$$ellipsoidArc(8) = \max\left(\text{floor}\left(\frac{\omega_{included}}{2}\right), 0\right) \quad (A28)$$

$$ellipsoidArc(9) = \text{Confidence} \quad (A29)$$

The invention claimed is:

1. A method for reporting positioning data from a base station in a cellular communication system, the method comprising:
   performing, in a base station, a measurement of a time of radio signal propagation concerning signaling with a first user equipment within a coverage of said base station, giving a time value;
   coding, in said base station, said time value as a multi-symbol time report sequence;
   obtaining, in said base station, auxiliary positioning information data concerning said first user equipment;
   modifying, in said base station, at least one symbol of said multi-symbol time report sequence for representing said auxiliary positioning information data, thereby changing the time value encoded in the multi-symbol time report sequence; and
   reporting, from said base station, said modified multi-symbol time report sequence.

2. The method according to claim 1, wherein said time of radio signal propagation is a round-trip time.

3. The method according to claim 1, wherein said auxiliary positioning information data comprises an identification of an antenna sector within which said first user equipment is situated.

4. The method according claim 1, wherein said multi-symbol time report sequence is a multi-bit time report sequence.

5. The method according to claim 1, wherein said modifying comprises modifying n least significant symbols of said multi-symbol time report sequence, where n is an integer larger than 0.

6. The method according to claim 5, wherein n≤3.

7. The method according to claim 6, wherein n≤2.

8. The method according to claim 7, wherein n=1.

9. The method according to claim 1, further comprising receiving, from a positioning node, an order for said measuring of said time of radio signal propagation, wherein said reporting of the modified multi-symbol time report sequence is performed to said positioning node.

10. A method for estimation of a position of a first user equipment in a cellular communication system, the method comprising:
    receiving, in a positioning node, a multi-symbol time report sequence concerning said first user equipment, from a base station to which said first user equipment is connected;
    interpreting, in said positioning node, said multi-symbol time report sequence as a time of radio signal propagation concerning signaling with a first user equipment, and interpreting at least one symbol of said multi-symbol time report sequence as auxiliary positioning information data, wherein the value or values of said at least one symbol also influence the interpreting of said multi-symbol time report sequence as the time of radio signal propagation; and
    estimating, in said positioning node, a position of said first user equipment based on said time of radio signal propagation and said auxiliary positioning information data.

11. The method according to claim 10, wherein said estimating comprises calculation of included and offset angles of an ellipsoid arc.

12. The method according to claim 10, wherein said estimating comprises:
    calculating a position of said first user equipment based on said time of radio signal propagation; and refining said calculated position by use of said auxiliary positioning information data.

13. The method according to claim 12, wherein said refining comprises calculation of included and offset angles of an ellipsoid arc.

14. The method according to claim 10, wherein said time of radio signal propagation is a round-trip time, and wherein the method further comprises obtaining, in said positioning node, a RxTx latency report comprising a representation of a RxTx latency, from said first user equipment, and wherein said estimating a position of said first user equipment is further based on said RxTx latency.

15. The method according to claim 14, further comprising ordering said first user equipment to perform a RxTx latency measurement and to report said RxTx latency in said RxTx latency report.

16. The method according to claim 10, wherein said auxiliary positioning information data comprises an identification of an antenna sector within which said first user equipment is situated.

17. The method according to claim 10, wherein said multi-symbol time report sequence is a multi-bit time report sequence.

18. The method according to claim 10, wherein said step of interpreting comprises interpreting the n least-significant symbols of said multi-symbol time report sequence as said auxiliary positioning information data, where n is an integer larger than zero.

19. The method according to claim 18, wherein $n \leq 3$.

20. The method according to claim 19, wherein $n \leq 2$.

21. The method according to claim 20, wherein $n=1$.

22. The method according to claim 10, further comprising sending an order to said base station for measuring said time of radio signal propagation, obtaining said auxiliary positioning information data, and reporting said time of radio signal propagation and said auxiliary positioning information data as said multi-symbol time report sequence.

23. A base station in a cellular communication system, comprising:
   a timer configured to measure a time of radio signal propagation concerning signaling with a first user equipment within a coverage of said base station, giving a time value;
   a report section, connected to said timer and configured to code said time value as a multi-symbol time report sequence;
   said report section being further configured to obtain auxiliary positioning information data concerning said first user equipment;
   said report section being further configured to modify at least one symbol of said multi-symbol time report sequence for representing said auxiliary positioning information data, thereby changing the time value encoded in the multi-symbol time report sequence; and
   a control signaling section, connected to said report section and configured to report said modified multi-symbol time report sequence.

24. The base station according to claim 23, wherein said timer is configured to measure a round-trip time, whereby said time value is a round-trip time value.

25. The base station according to claim 23, wherein said base station serves a plurality of antennas, and said auxiliary positioning information data comprises an identification of an antenna sector within which said first user equipment is situated.

26. The base station according to claim 25, wherein said plurality of antennas are operated together as an omni-antenna for downlink signaling.

27. The base station according to claim 23, further comprising a receiver configured to receive an order for said measuring of said time of radio signal propagation concerning signaling with said first user equipment from a positioning node, wherein said control signaling section is further configured to report said modified multi-symbol time report sequence to said positioning node.

28. A positioning node in a cellular communication system, comprising:
   a receiver configured to receive a multi-symbol time report sequence concerning a first user equipment;
   an interpreter connected to said receiver and configured to interpret said multi-symbol time report sequence as a time of radio signal propagation concerning signaling with a first user equipment, and to interpret at least one symbol of said multi-symbol time report sequence as auxiliary positioning information data, wherein the value or values of said at least one symbol also influence the interpreting of said multi-symbol time report sequence as the time of radio signal propagation; and
   a position estimator, connected to said interpreter and configured to estimate a position of said first user equipment based on said time of radio signal propagation and said auxiliary positioning information data.

29. The positioning node according to claim 28, wherein said position estimator is configured to calculate a position of said first user equipment based on said time of radio signal propagation and to refine said calculated position by use of said auxiliary positioning information data.

30. The positioning node according to claim 28, wherein
   said time of radio signal propagation concerning signaling with a first user equipment is a round-trip time;
   said receiver is further configured to obtain a RxTx latency report comprising a representation of a RxTx latency, from said first user equipment;
   said position estimator is configured to estimate the position of said first user equipment further based on said RxTx latency.

31. The positioning node according to claim 30, further comprising a transmitter configured to order said first user equipment to perform a RxTx latency measurement and to report said RxTx latency in said RxTx latency report.

32. The positioning node according to claim 28, wherein said cellular communication system comprises base stations that serve a respective plurality of antennas, and said auxiliary positioning information data comprises an identification of an antenna sector within which said first user equipment is situated.

33. The positioning node according to claim 32, wherein said plurality of antennas are operated together as an omni-antenna for downlink signaling.

34. The positioning node according to claim 28, wherein said positioning node is comprised in a radio network controller.

35. The positioning node according to claim 28, wherein said positioning node is separate node, being connected to a radio network controller.

36. The positioning node according to claim 28, further comprising a transmitter configured to send an order to a base station for measuring said time of radio signal propagation, obtaining said auxiliary positioning information data, and reporting said time of radio signal propagation and said auxiliary positioning information data as said multi-symbol time report sequence.

* * * * *